United States Patent
Brandt et al.

(10) Patent No.: US 8,011,483 B2
(45) Date of Patent: Sep. 6, 2011

(54) VENTILATION DEVICE FOR A COMBINED SPRING ACCUMULATOR AND OPERATING BRAKE CYLINDER

(75) Inventors: Oliver Brandt, Braunschweig (DE); Wilfried Matthias, Bad Nenndorf (DE); Andreas Richter, Wedemark (DE)

(73) Assignee: WABCO GmbH, Hannover (DE)

( * ) Notice: Subject to any disclaimer, the term of this patent is extended or adjusted under 35 U.S.C. 154(b) by 1081 days.

(21) Appl. No.: 11/795,741

(22) PCT Filed: Nov. 11, 2005

(86) PCT No.: PCT/EP2005/012128
§ 371 (c)(1),
(2), (4) Date: Jul. 20, 2007

(87) PCT Pub. No.: WO2006/084492
PCT Pub. Date: Aug. 17, 2006

(65) Prior Publication Data
US 2008/0116741 A1    May 22, 2008

(30) Foreign Application Priority Data
Feb. 9, 2005  (DE) .................. 10 2005 005 722

(51) Int. Cl.
*B60T 17/08* (2006.01)
(52) U.S. Cl. .................. 188/153 D; 188/170
(58) Field of Classification Search ........... 188/153 R, 188/153 D, 170; 251/325
See application file for complete search history.

(56) References Cited

U.S. PATENT DOCUMENTS

| | | | |
|---|---|---|---|
| 2,976,850 | A | 3/1961 | Stelzer |
| 3,302,530 | A | 2/1967 | Dobrikin el al. |
| 3,406,609 | A | 10/1968 | Cox, Jr. |
| 3,581,627 | A | 6/1971 | Campanini |
| 3,710,692 | A | 1/1973 | Valentine |
| 3,712,178 | A | 1/1973 | Hensley |
| 3,736,842 | A | 6/1973 | Valentine |
| 3,800,668 | A | 4/1974 | Valentine |
| 3,813,994 | A | 6/1974 | Swander, Jr. et al. |
| 4,889,037 | A | 12/1989 | Goral et al. |
| 5,083,495 | A | 1/1992 | Satoh |
| 5,215,170 | A * | 6/1993 | Rapa ........................ 188/170 |
| 5,228,377 | A | 7/1993 | Watanabe |
| 5,460,076 | A | 10/1995 | Pierce et al. |
| 5,640,894 | A | 6/1997 | Zarybnicky, Sr. et al. |
| 5,671,654 | A | 9/1997 | Plantan |
| 5,722,311 | A | 3/1998 | Pierce et al. |

(Continued)

FOREIGN PATENT DOCUMENTS
DE        23 08 838 A1    8/1973
(Continued)

*Primary Examiner* — Robert Siconolfi
*Assistant Examiner* — Anna Momper
(74) *Attorney, Agent, or Firm* — Kramer Levin Naftalis & Frankel LLP

(57) ABSTRACT

A ventilation device provided which includes a valve arranged in a combined spring accumulator and operating brake cylinder. On depressurization of a pressure medium chamber in the spring accumulator brake cylinder, ventilation of a spring accumulator chamber of the spring accumulator brake cylinder, from the pressure medium chamber of the operating brake cylinder, is effected. A chambers is provided on the side of a valve piston in the valve, facing away from a control chamber, which, with an open valve, connects a first working connections to this chamber and, hence, to a second working connection, arranged axially on the front side of the valve, by means of a passage provided in the valve piston.

23 Claims, 8 Drawing Sheets

U.S. PATENT DOCUMENTS

| | | | |
|---|---|---|---|
| 5,836,233 A | 11/1998 | Rumsey | |
| 5,873,297 A | 2/1999 | Stojic | |
| 5,937,733 A | 8/1999 | Stojic | |
| 6,079,312 A | 6/2000 | Plantan | |
| RE36,955 E | 11/2000 | Pierce et al. | |
| 6,148,711 A * | 11/2000 | Stojic | 91/440 |
| 6,264,291 B1 | 7/2001 | Eberling et al. | |
| 6,588,314 B1 | 7/2003 | Stojic | |
| 6,874,405 B2 | 4/2005 | Fisher | |
| 6,907,818 B2 | 6/2005 | Anderson | |
| 6,918,409 B1 * | 7/2005 | Parker | 137/614.11 |
| 7,048,000 B2 | 5/2006 | Koelzer | |
| 7,097,011 B2 | 8/2006 | Severinsson | |
| 7,118,614 B2 | 10/2006 | Welin et al. | |
| 7,121,191 B1 | 10/2006 | Fisher | |
| 7,147,006 B2 | 12/2006 | Shaw et al. | |
| 2008/0000733 A1 | 1/2008 | Ehrlich | |

FOREIGN PATENT DOCUMENTS

| | | |
|---|---|---|
| DE | 39 11 866 C2 | 8/1990 |
| DE | 102 28 934 A1 | 1/2004 |
| EP | 0 490 841 A | 6/1992 |
| GB | 2 100 794 A | 1/1983 |
| WO | WO 2004002799 A1 * | 1/2004 |

* cited by examiner

VENTILATION DEVICE FOR A COMBINED SPRING ACCUMULATOR AND OPERATING BRAKE CYLINDER

BACKGROUND OF THE INVENTION

The present invention relates to a ventilation device for a combined spring accumulator and operating brake cylinder of a vehicle.

A ventilation device of the general type under consideration is described in DE 102 28 934 A1.

If the spring-actuated brake cylinder of a combined spring accumulator and operating brake cylinder is actuated by depressurization of its pressurized-fluid chamber, the spring chamber becomes larger because of the resulting extension of the spring and displacement of the piston. To ensure that reduced pressure that would prevent delivery of the spring force does not occur in the spring chamber while it is becoming larger, the spring chamber is in communication with the pressurized-fluid chamber of the operating brake cylinder via a pressure-controlled valve device functioning as a ventilation device.

Because the compressed air supplied to the pressurized-fluid chamber of the spring-actuated brake cylinder and to the pressurized-fluid chamber of the operating brake cylinder is cleaned and dried in the upstream compressed-air intake and conditioning system, the risk of corrosion and fouling in the region of the spring chamber and at the spring is decisively reduced by this type of ventilation.

The known ventilation device uses a pressure-controlled valve which has two working ports and one control port as well as a valve piston that can move in the direction of the longitudinal axis of the valve. Depending on whether the pressurized-fluid chamber of the operating brake cylinder and/or the pressurized-fluid chamber of the spring-actuated brake cylinder is or are vented or pressurized with compressed air, and depending on the position in which the piston of the spring-actuated brake cylinder is located, the two working ports of the valve, and, thus, also the spring chamber of the spring-actuated brake cylinder and the pressurized-fluid chamber of the operating brake cylinder, are in communication with one another or shut off from one another.

In the pressure-controlled valve of the known ventilation device, the two working ports and the control port are disposed on the valve in such a way that they run perpendicular to the longitudinal axis of the valve piston. When the pressure-controlled valve is in its open position, the air flows from the chamber containing the higher pressure—either the spring chamber of the spring-actuated brake cylinder or the pressurized-fluid chamber of the operating brake cylinder—via the one working port associated with that chamber to the respective other working port, which is associated with the chamber containing the lower pressure. In the process, the air flow is deflected several times in the valve.

SUMMARY OF THE INVENTION

Generally speaking, in accordance with the present invention, an improved ventilation device for a combined spring accumulator and operating brake cylinder is provided that overcomes disadvantages associated with conventional devices.

In accordance with an embodiment of the present invention, a ventilation device for a combined spring accumulator and operating brake cylinder is provided and includes a spring-actuated brake cylinder having a piston that can be actuated by a spring and that divides the spring-actuated brake cylinder into a pressurized-fluid chamber and a spring chamber housing the spring. The operating brake cylinder includes a piston that can be actuated by pressurized fluid against the force of a spring and that divides the operating brake cylinder into a pressurized-fluid chamber and a spring chamber housing the spring. A piston rod, which extends in the direction of the pressurized-fluid chamber of the service-brake cylinder via a through hole in a wall that separates the pressurized-fluid chamber of the spring-actuated brake cylinder from the pressurized-fluid chamber of the service-brake cylinder, is disposed on the piston of the spring-actuated brake cylinder (the piston rod is guided sealingly in the through hole by means of a sealing element that annularly surrounds the piston rod). The ventilation device is provided with a valve which is disposed in or on the piston rod of the piston of the spring-actuated brake cylinder, and via which breathing of the spring chamber of the spring-actuated brake cylinder can be effected from the pressurized-fluid chamber of the operating brake cylinder during depressurization of the pressurized-fluid chamber of the operating brake cylinder. The valve can be moved against a restoring force from its open home position to its closed position during injection of pressurized fluid into the pressurized-fluid chamber of the operating brake cylinder. The valve includes first and second working ports, a working chamber, a control chamber in communication with the pressurized-fluid chamber of the operating brake cylinder, and a movable valve piston. When the pressure of the valve piston injected into the pressurized-fluid chamber of the operating brake cylinder is admitted to its control chamber, the valve piston can be driven by the pressure against the restoring force in closing direction of the valve. The valve includes a space at the end of the valve piston distal to the control chamber which is in communication with the second working port. One or more passages of the valve piston place the first working port in communication with the space in open position of the valve.

The inventive ventilation device offers the particular advantage that the air flow has to overcome only a small resistance on its way from one working port to the other working port of the ventilation valve, and so dynamic pressure development upstream or downstream from the passage of the valve piston can be avoided.

The favorable flow behavior is achieved by the fact that, among other things, the air flow is deflected only one time from the respective one working port to the respective other working port.

The passage cross section of the ventilation valve can be varied in simple manner by increasing or decreasing the cross section of the passage disposed in or on the valve piston.

Desirably, the working ports as well as the passage disposed in or on the valve piston have at least approximately equally large cross sections for the air flow.

Advantageously, the response sensitivity of the valve can be varied by changing the mutually facing active faces of the valve piston and by using different springs for the valve.

A further advantage of the inventive ventilation device is that it can be manufactured simply and inexpensively.

According to an embodiment of the present invention, the ventilation valve of the ventilation device is designed as a pilot-controlled valve, thus achieving the advantage that, during travel of the piston of the spring-actuated brake cylinder in brake-actuation direction, first the control chamber of the ventilation valve and, thereafter, a working port of the ventilation valve is placed in communication with the pressurized-fluid chamber of the operating brake cylinder. For this purpose, the ventilation device is provided with a second valve and, if necessary, a third valve, so that, by means of the second valve, the pressurized-fluid chamber of the operating brake cylinder can be shut off from the working chamber, in the direction of the working chamber, and, by means of the third valve, the pressurized-fluid chamber of the operating brake cylinder can be shut off from the control chamber of the first valve serving as the ventilation valve, in the direction of the control chamber.

Pilot control of the ventilation valve ensures, in a simple manner that, during travel of the piston of the spring-actuated brake cylinder in brake-actuation direction, with simultaneous presence of pressurized fluid in the pressurized-fluid chamber of the operating brake cylinder, the ventilation valve is already shifted to its closed position when communication between the working port of the ventilation valve and the pressurized-fluid chamber of the operating brake cylinder has not yet been released.

Advantageously, the ventilation valve is so designed and so disposed on or in the piston rod of the spring-actuated brake cylinder that the sealing element disposed in the through hole for the piston rod can perform the function of a sealing member for the second valve and, if necessary, for the third valve, in addition to its sealing and guiding function for the piston rod.

In addition, favorable response behavior of the spring-actuated brake cylinder is achieved by the inventive ventilation device for the spring chamber of the spring-actuated brake cylinder.

It is thus an object of the present invention to improve upon the conventional ventilation device of the type described above, especially as regards more favorable flow behavior of the ventilation device.

Still other objects and advantages of the present invention will in part be obvious and will in part be apparent from the specification.

The present invention accordingly comprises the features of construction, combination of elements, and arrangements of parts which will be exemplified in the construction hereinafter set forth, and the scope of the invention will be indicated in the claims.

BRIEF DESCRIPTION OF THE DRAWINGS

The present invention will be described in more detail hereinafter on the basis of the accompanying drawings, wherein.

DETAILED DESCRIPTION OF THE PREFERRED EMBODIMENTS

Figure 1:
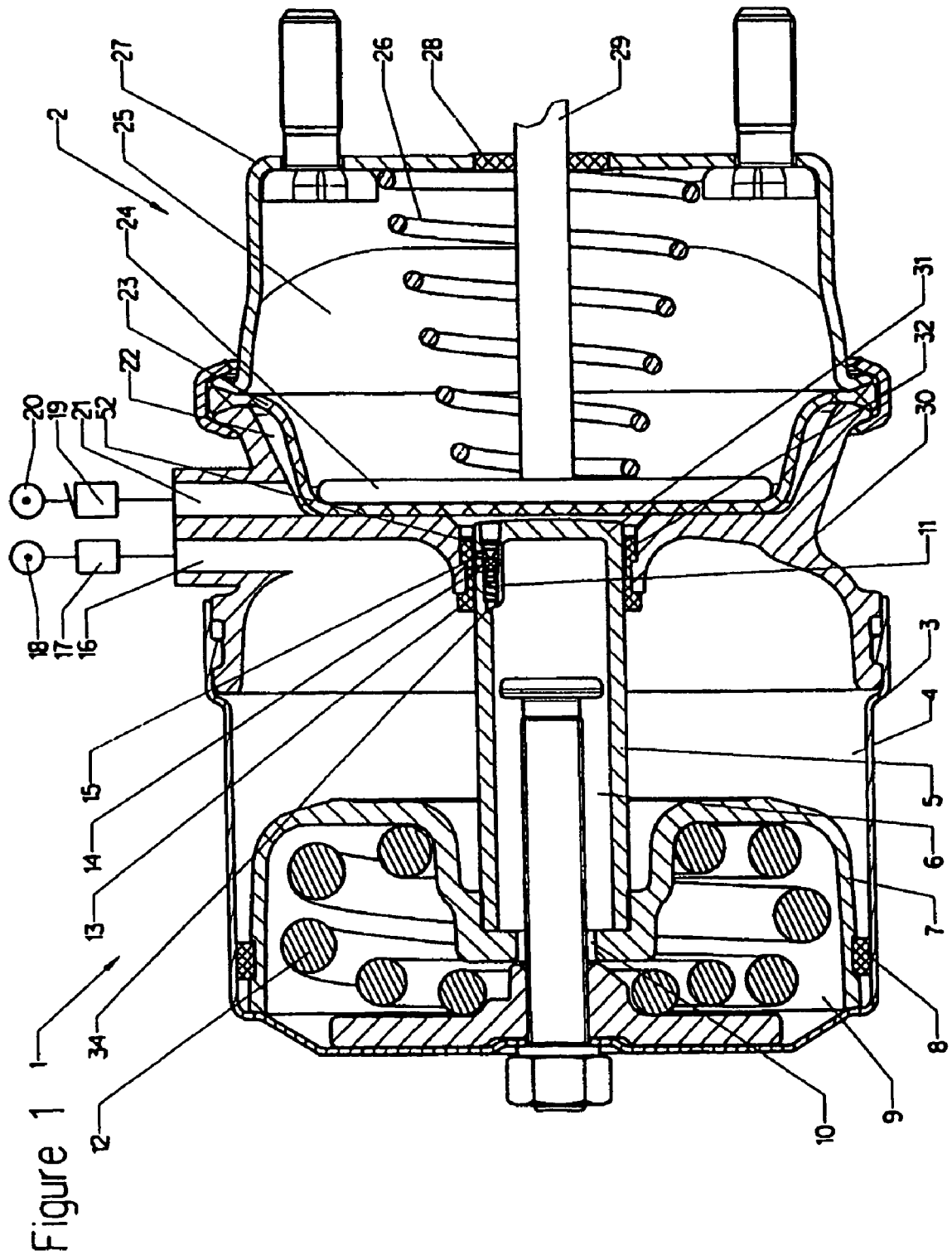
FIG. 1 is a sectional view of a combined spring accumulator and operating brake cylinder according to an embodiment of the present invention, in which a pilot-controlled valve device is disposed on the piston rod of the piston of the spring-actuated brake cylinder to place the spring chamber of the spring-actuated brake cylinder in communication with the pressurized-fluid chamber of the operating brake cylinder, such that pressurized fluid is admitted to the pressurized-fluid chamber of the spring-actuated brake cylinder and the pressurized-fluid chamber of the operating brake cylinder is vented.

Referring now to the drawing figures, FIG. 1 depicts a combined spring accumulator and operating brake cylinder (1, 2), which includes a spring-actuated brake cylinder (1) and an operating brake cylinder (2) assembled as a single structural unit. Spring-actuated brake cylinder (1) is provided with a housing (30, 3), which includes a wall (30) common to spring-actuated brake cylinder (1) and operating brake cylinder (2) as well as a cover (3) (e.g., pot-shaped). A piston (7) functioning as the spring-actuated piston and sealed by means of an O-ring (8) is disposed in housing (30, 3) such that it can travel in the direction of the longitudinal axis of housing (30, 3). Piston (7) divides spring-actuated brake cylinder (1) into a pressurized-fluid chamber (4) functioning as a release chamber and a spring chamber (9). A spring (12) disposed in spring chamber (9) functions as an actuator spring, via a spring plate which is braced at one end on cover (3) of housing (30, 3), and which, with its other end, urges piston (7) in the direction of pressurized-fluid chamber (4) (brake-actuation direction).

A piston rod (5) is centrally disposed on the side of piston (7) bounding pressurized-fluid chamber (4). Piston rod (5) is formed by a tube and extends through pressurized-fluid chamber (4) and a through hole (32) disposed in wall (30) in the direction of a pressurized-fluid chamber (22) of operating brake cylinder (2) functioning as the service brake chamber. At its end proximal to pressurized-fluid chamber (22) of operating brake cylinder (2), piston rod (5) is closed off by means of a bottom part (31). Wall (30) is provided with an annular projection, which extends into pressurized-fluid chamber (4) of spring-actuated brake cylinder (1) and bounds the through hole (32) for piston rod (5) of spring-actuated brake cylinder (1).

An annular sealing element (13, 52) is disposed in through hole (32) for piston rod (5). Annular sealing element (13, 52) sealingly surrounds piston rod (5) and has the function of a guide element for piston rod (5) in addition to its sealing function. A through hole (10) for a manually activated spring-actuated release element is disposed coaxially with piston rod (5) in piston (7). The cross section for through hole (10) is chosen such that, between the spring-actuated release element and the wall bounding through hole (10), there remains an annular gap, via which an inner space of tubular piston rod (5) functioning as a connecting duct (6) is in communication with spring chamber (9).

Pressurized-fluid chamber (4) of the spring-actuated brake cylinder can be placed selectively in communication with a compressed-air source (18) or with atmosphere via a pressurized-fluid port (16) in wall (30) of housing (30, 3) of spring-actuated brake cylinder (1), and via a valve in communication therewith and designed, for example, as a handbrake valve (17).

Operating brake cylinder (2), which has a housing (30, 27), is connected to spring-actuated brake cylinder (1). Housing (30, 27) of operating brake cylinder (2) is formed by wall (30) common to spring-actuated brake cylinder (1) and operating brake cylinder (2) and by a cover (27) (e.g., pot-shaped). A piston (23, 24), including a diaphragm (23) and a diaphragm plate (24) and functioning as the service brake piston, divides operating brake cylinder (2) into pressurized-fluid chamber (22) functioning as the service brake chamber and a spring chamber (25). Diaphragm (23) is clamped between wall (30) and cover (27) of housing (30, 27). Piston (23, 24) is urged in the direction of pressurized-fluid chamber (22) (brake-releasing direction) by a spring (26) which is braced on cover (27). On diaphragm plate (24), there is centrally disposed a piston rod (29) which is led out of housing (30, 27) via a through hole in cover (27). In the through hole, there is disposed a sealing element (28) which surrounds piston rod (29) and has the function of a guide for piston rod (29) in addition to its sealing function. A pressurized-fluid port (21) is disposed in wall (30) of housing (30, 27). Via pressurized-fluid port (21) and a valve designed as service brake valve (19), pressurized-fluid chamber (22) can be placed selectively in communication with a compressed-air source (20) or with atmosphere.

The wall of tubular piston rod (5) of spring-actuated brake cylinder (1) is provided at its free end with a thickened region (11). In thickened region (11), there is disposed, to function as a ventilation valve, a first valve (39, 44, 49, 50, 40, 34, 14, 15, 37, 47, 48) of the ventilation device for spring chamber (9) of spring-actuated brake cylinder (1).

Figure 2:
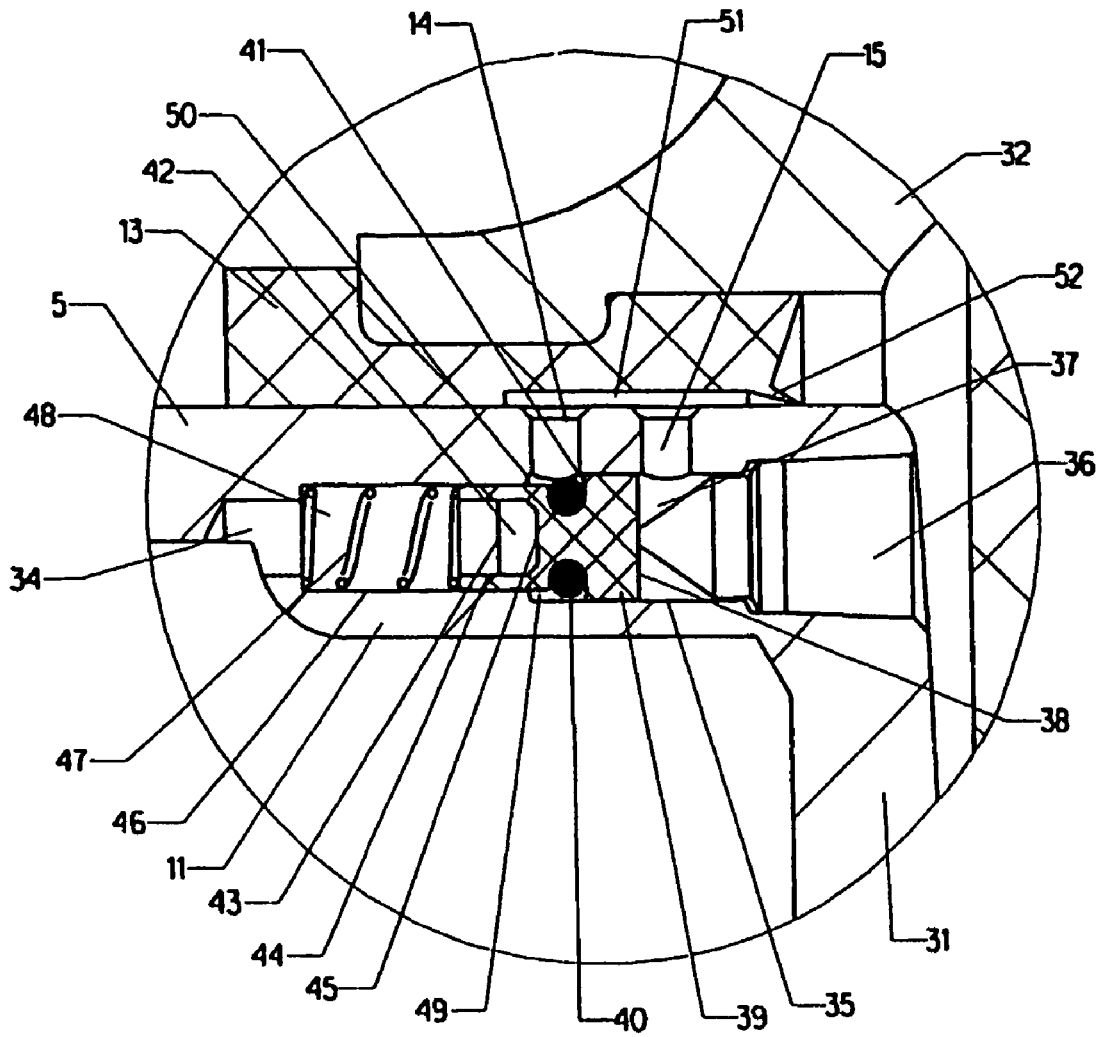
FIG. 2 is an enlarged view of the region, including the valve device, of the piston rod of the spring-actuated brake cylinder depicted in FIG. 1, wherein the ventilation valve is in its open position and the shutoff valve as well as the pilot valve are in their closed positions.
Figure 2A:
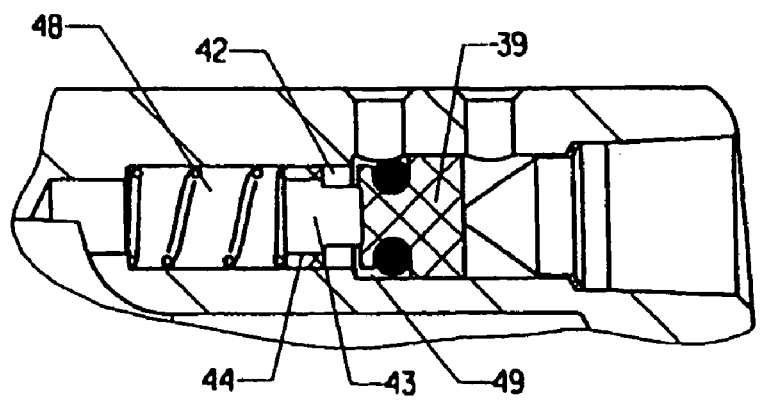
FIG. 2a is a sectional view through the valve device depicted in FIG. 2, wherein the valve piston is turned 90° around its longitudinal axis.

Some components of the first valve can be seen only in FIGS. 2 and 2a since the first valve is shown on larger scale in these figures.

The ventilation device according to embodiments of the present invention will be explained in greater detail hereinafter on the basis of FIG. 1, FIG. 2 and FIG. 2a.

A multiply stepped bore (35, 46) is disposed in thickened region (11) of piston rod (5). Multiply stepped bore (35, 46) begins at bottom part (31) of piston rod (5), runs in the direction of the longitudinal axis of piston rod (5), extends into thickened region (11) and passes therethrough, so that the bore is in communication with connecting duct (6) in piston rod (5), which duct leads to spring chamber (9) of spring-actuated brake cylinder (1). At its end region having the largest diameter, bore (35, 46) is closed off by means of a closure (36). In thickened region (11) of piston rod (5), there are disposed a first bore functioning as a first working port (14), a second working port (34) formed as a sub-region of stepped bore (35, 46) and a third bore functioning as a control port (15). First working port (14) and control port (15) are disposed such that they run perpendicular to the longitudinal axis of bore (35, 46) in thickened part (11) of piston rod (5), beginning at the outer cylindrical surface of piston rod (5) and opening into sub-region (35) of stepped bore (35, 46) having the larger diameter. Second working port (34) is formed by the end region of stepped bore (35, 46) disposed in thickened part (11) of piston rod (5) and having the smallest diameter, this end region of bore (35, 46) opening into the inner space of piston rod (5) functioning as connecting duct (6).

A stepped valve piston (39, 44) is disposed in stepped bore (35, 46). Stepped valve piston (39, 44) is constructed and arranged such that it can travel slidingly in the direction of the longitudinal axis of bore (35, 46). With its end face proximal to closure part (36), valve piston (39, 44) bounds a control chamber (37) into which control port (15) opens. With its end face distal to closure part (36), valve piston (39, 44) bounds a space (48), which functions as the spring space, is disposed at the end of valve piston (39, 44) distal to control chamber (37) and is in communication with second working port (34). For practical purposes, space (48) represents part of second working port (34). The face of valve piston (39, 44) exposed to the medium in space (48) is the end face of valve piston (39, 44) bounding space (48). Valve piston (39, 44) and bore (35, 46) are so dimensioned and the material for valve piston (39, 44) and for the component (piston rod (5)) provided with bore (35, 46) are so matched to one another that valve piston (39, 44) bears sealingly with its portion (44) having the smaller diameter on the wall of sub-region (46) of bore (35, 46) having the smaller diameter and with its portion (39) having the larger diameter on the wall of sub-region (35) of bore (35, 46) having the larger diameter. This means that an additional seal by means of an O-ring disposed on valve piston (39, 44) is not absolutely necessary for sealing between control chamber (37) and a working chamber (49). In the region of the step of valve piston (39, 44), there is disposed a circumferential groove in the cylindrical surface of portion (44) of valve piston (39, 44) having the smaller diameter. The groove functions as a seat (41) for an annular sealing member (40).

A step of stepped bore (35, 46) opposite sealing member (40)—the step from sub-region (35) having the larger diameter to sub-region (46) having the smaller diameter in stepped bore (35, 46)—functions as a valve seat (50), on which valve piston (39, 44) bears with its sealing member (40) when compressed air is admitted to control chamber (37). Working chamber (49), into which first working port (14) opens, is bounded by valve seat (50) and portion (39) of valve piston (39, 44) having the larger diameter. In space (48), there is disposed a compression spring (47), which functions as the restoring force for valve piston (39, 44), is braced with its end on a further step of stepped bore (36, 46)—the step from sub-region (46) of stepped bore (35, 46) having the smaller diameter to second working port (34)—and with its other end urges valve piston (39, 44) in the direction of closure part (36) formed as a stop for valve piston (39, 44).

Valve piston (39, 44) has a recess (43) formed in the manner of a blind bore. Recess (43) begins at end face of valve piston (39, 44) distal to closure part (36) for bore (35, 46) and extends in the direction of the longitudinal axis of valve piston (39, 44), in which it is routed. In the wall of portion (44) of valve piston (39, 44) having the smaller diameter and bounding recess (43), there is disposed close to seat (41) for sealing member (40) at least one through hole (42) (e.g., window-like) which begins at the outer cylindrical surface of valve piston (39, 44), runs perpendicular to the longitudinal axis of valve piston (39, 44) and opens into recess (43) of valve piston (39, 44). It should be understood that through hole (42) can also be disposed in adjoining manner directly on seat (41) for sealing member (40). Recess (43) and through hole (42) of valve piston (39, 44) function as a passage for placing first working port (14) in communication with space (48) and, thus, with second working port (34), when valve (50, 40) is in its open position.

FIG. 2a depicts through hole (42) and recess (43) of valve piston (39, 44) in communication therewith in a sectional view through the valve device depicted in FIG. 2 in which valve piston (39, 44) is turned 90° around its longitudinal axis.

Valve piston (39, 44) has a first active face (38) and a second active face (45) oriented in the direction opposite to first active face (38). First active face (38) is formed by the end face of valve piston (39, 44) bounding control chamber (37), and second active face (45) is formed by the bottom of recess (43) in valve piston (39, 44). A negligibly small further active face oriented in the direction opposite to first active face (38) results from the step from portion (44) having the smaller diameter to portion (39) having the larger diameter of valve piston (39, 44).

Active faces (38, 45) on valve piston (39, 44) and spring (47) are designed such that, when the pressure from pressurized-fluid chamber (22) of operating brake cylinder (2) is admitted to control chamber (37), the force exerted by the pressure on first active face (38) of valve piston (39, 44) in closing direction of first valve (39, 44, 49, 50, 40, 34, 14, 15, 37, 47, 48) is larger than the force exerted by spring (47) on valve piston (39, 44) in the direction opposite to this force in opening direction of first valve (39, 44, 49, 50, 40, 34, 14, 15, 37, 47, 48) and the force exerted by the pressure in space (48) on second active face (45) and by the pressure in working chamber (49) on the third active face in opening direction of first valve (39, 44, 49, 50, 40, 34, 14, 15, 37, 47, 48).

The cross section of the spring wire of spring (47) corresponds advantageously to the thickness of the wall of valve piston (39, 44) bounding recess (43) in valve piston (39, 44).

Valve piston (39, 44) and sealing element (40), together with valve seat (50), first working port (14), second working port (34) and control port (15) as well as control chamber (37), working chamber (49), spring (47) and space (48), form first valve (39, 44, 49, 50, 40, 34, 14, 15, 37, 47, 48), which functions as the ventilation valve of the ventilation device for spring chamber (9) of spring-actuated brake cylinder (1).

Sealing element (13, 52) guiding piston rod (5) of spring-actuated brake cylinder (1) includes, on its face proximal to piston rod (5), a recess (51) in which first working port (14) and control port (15) of first valve (39, 44, 49, 50, 40, 34, 14, 15, 37, 47, 48) are located. The end region of sealing element (13, 52) proximal to pressurized-fluid chamber (22) of operating brake cylinder (2) is formed as sealing lip (52), which annularly surrounds piston rod (5) and bears sealingly on piston rod (5). Sealing lip (52) forms a control edge, which cooperates with first working port (14) and control port (15).

The bore in piston rod (5) functioning as first working port (14) of first valve (39, 44, 49, 50, 40, 34, 14, 15, 37, 47, 48) additionally has the function of a control aperture for a second valve (5, 14, 13, 52) designed as a slide valve, and the bore in piston rod (5) functioning as control port (15) of first valve (39, 44, 49, 50, 40, 34, 14, 15, 37, 47, 48) additionally has the function of a control aperture for a third valve (5, 15, 13, 52), formed as a slide valve, of the ventilation device for spring chamber (9) of spring-actuated brake cylinder (1). Second valve (5, 14, 13, 52) functions as a shutoff valve, by means of which working chamber (49) can be placed in communication with or shut off from pressurized-fluid chamber (22) of operating brake cylinder (2) as a function of the position of piston rod (5) of spring-actuated brake cylinder (1); and third valve (5, 15, 13, 52) has the function of a pilot valve, by means of which control chamber (37) can be placed in communication with or shut off from pressurized-fluid chamber (22) of operating brake cylinder (2) as a function of the position of piston rod (5) of spring-actuated brake cylinder (1). Sealing lip (52) of sealing element (13, 52) is constructed and arranged such that second valve (5, 14, 13, 52) and also third valve (5, 15, 23, 52) in its closed position shuts off communication between pressurized-fluid chamber (22) of operating brake cylinder (2) and working chamber (49) or respectively of control chamber (37) of first valve (39, 44, 49, 50, 40, 34, 14, 15, 37, 47, 48) only in the direction of working chamber (49) or, respectively, in the direction of control chamber (37).

First working port (14) and control port (15) are disposed in the wall of piston rod (5) and disposed relative to annular sealing element (13, 52) and to pressurized-fluid chamber (22) of operating brake cylinder (2) such that they are covered by sealing element (13, 52) when piston (7) of spring-actuated brake cylinder (1) is in its left end position, in which it keeps spring (12) compressed (brake-released position).

First working port (14) and control port (15) are disposed relative to one another and to pressurized-fluid chamber (22) of operating brake cylinder (2) such that, starting from pressurized-fluid chamber (22) of operating brake cylinder (2), control port (15) is located closer to pressurized-fluid chamber (22) than to first working port (14). This arrangement of first working port (14) and control port (15) ensures that, during travel of piston (7) of spring-actuated brake cylinder (1) in brake-actuation direction (to the right, toward wall (30) of spring-actuated brake cylinder (1)), third valve (5, 15, 13, 52) functioning as the pilot valve is first moved to its open position placing pressurized-fluid chamber (22) of operating brake cylinder (2) in communication with control chamber (37) of first valve (39, 44, 49, 50, 40, 34, 14, 15, 37, 47, 48), and then second valve (5, 14, 13, 52) functioning as the shutoff valve is moved to its open position placing pressurized-fluid chamber (22) of operating brake cylinder (2) in communication with working chamber (49) of first valve (39, 44, 49, 50, 40, 34, 14, 15, 37, 47, 48).

Design of the ventilation valve as a pilot-controlled valve ensures that, when pressurized-fluid chamber (22) of operating brake cylinder (2) is pressurized and piston (7) of spring-actuated brake cylinder (1) is simultaneously actuated in brake-actuation direction, spring chamber (9) of spring-actuated brake cylinder (1) is not acted on by the pressure in pressurized-fluid chamber (22) of operating brake cylinder (2).

During travel of piston (7) of spring-actuated brake cylinder (1) in brake-releasing direction (to the left, away from wall (30)), second valve (5, 14, 13, 52) and then third valve (5, 15, 13, 52) are moved to closed position.

First valve (39, 44, 49, 50, 40, 34, 14, 15, 37, 47, 48) functioning as the ventilation valve, second valve (5, 14, 13, 52) functioning as the shutoff valve and third valve (5, 15, 13, 52) functioning as the pilot valve together form a pilot-controlled valve device (39, 44, 49, 50, 40, 34, 14, 15, 37, 47, 48, 5, 13, 52).

It should be understood that the first valve functioning as the ventilation valve can also be designed as a slide valve.

By different face combinations of valve piston (39, 44), achieved by changing the diameter tolerances of valve piston (39, 44), and by use of different springs, the actuating force necessary for actuation of first valve (39, 44, 49, 50, 40, 34, 14, 15, 37, 47, 48) can be varied in simple manner.

The passages (42, 43) in valve piston (39, 44) functioning to place the two working ports (14 and 34) in communication can also be designed by providing valve piston (39, 44) with ridge like projections which are formed onto seat (41) for sealing member (40), run in the direction of the longitudinal axis of valve piston (39, 44), and extend in the direction of space (48) functioning as the spring space, an annular member being formed on the free ends of the projections. The projections and the annular member then function simultaneously to guide valve piston (39, 44) in sub-region (46) of stepped bore (35, 46) having the smaller diameter.

Closure part (36) functioning as a stop for valve piston (39, 44) is fastened (screwed, press-fitted or bonded, for example) into bore (35, 46). If closure part (36) is press-fitted or screwed in, the stop formed for valve piston (39, 44) by closure part (36) can be adjusted and thus the passage cross section for the first valve can be varied.

Figure 3:
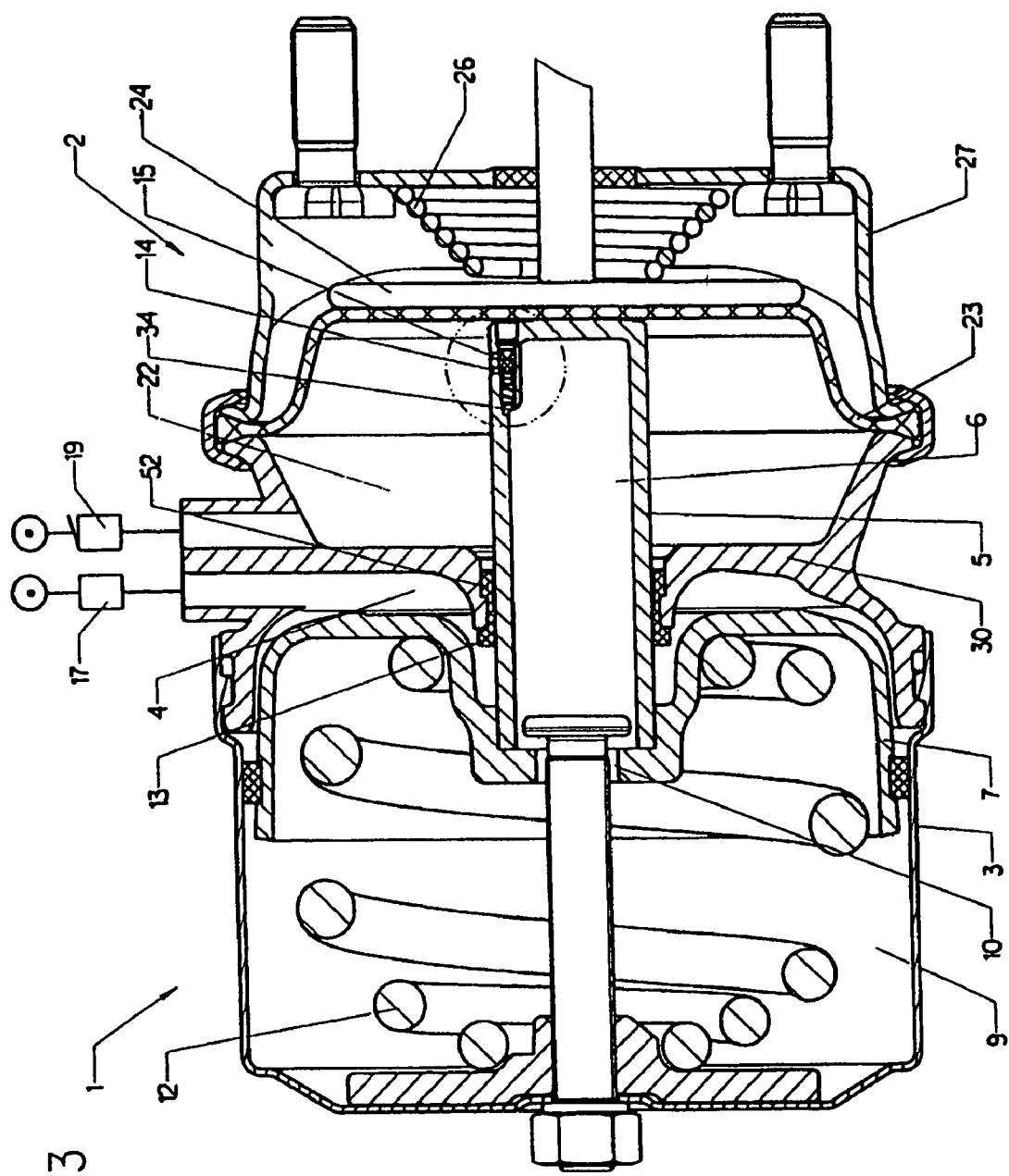
FIG. 3 shows the combined spring accumulator and operating brake cylinder depicted in FIG. 1, wherein the pressurized-fluid chamber of the spring-actuated brake cylinder and the pressurized-fluid chamber of the operating brake cylinder are vented.
Figure 5:
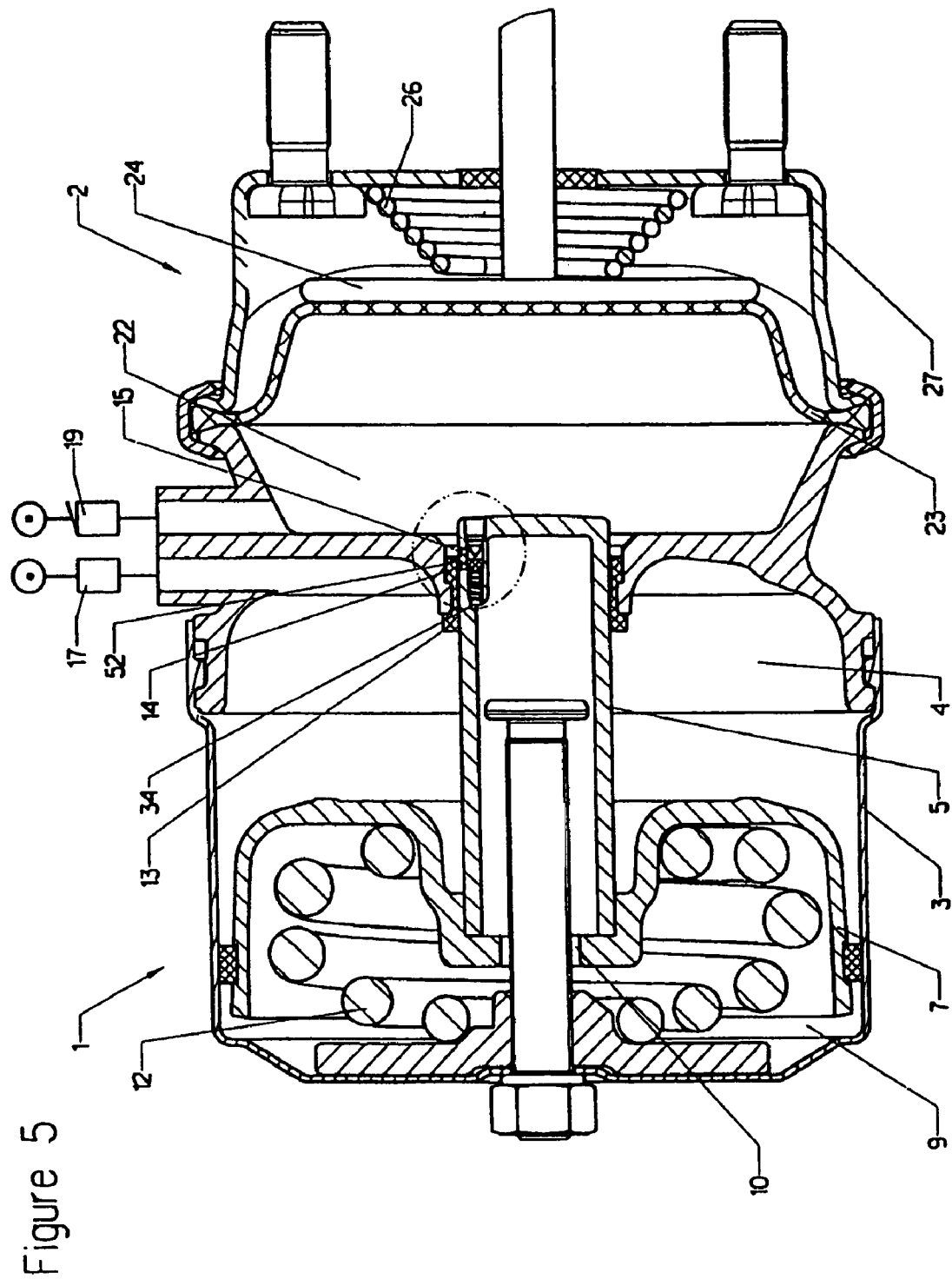
FIG. 5 shows the combined spring accumulator and operating brake cylinder depicted in FIG. 1 with the pressurized-fluid chamber of the operating brake cylinder pressurized and the pressurized-fluid chamber of the spring-actuated brake cylinder pressurized, while the depressurization phase is beginning in the pressurized-fluid chamber of the spring-actuated brake cylinder.

The combined spring accumulator and operating brake cylinders shown in FIGS. 3 and 5 will not be described in more detail, since they correspond in their structure to the combined spring accumulator and operating brake cylinder shown in FIG. 1. Components that are the same as components shown in FIG. 1 are denoted by like reference numerals. FIGS. 3 and 5 are provided to more particularly point out the function of the inventive ventilation device.

Figure 4:
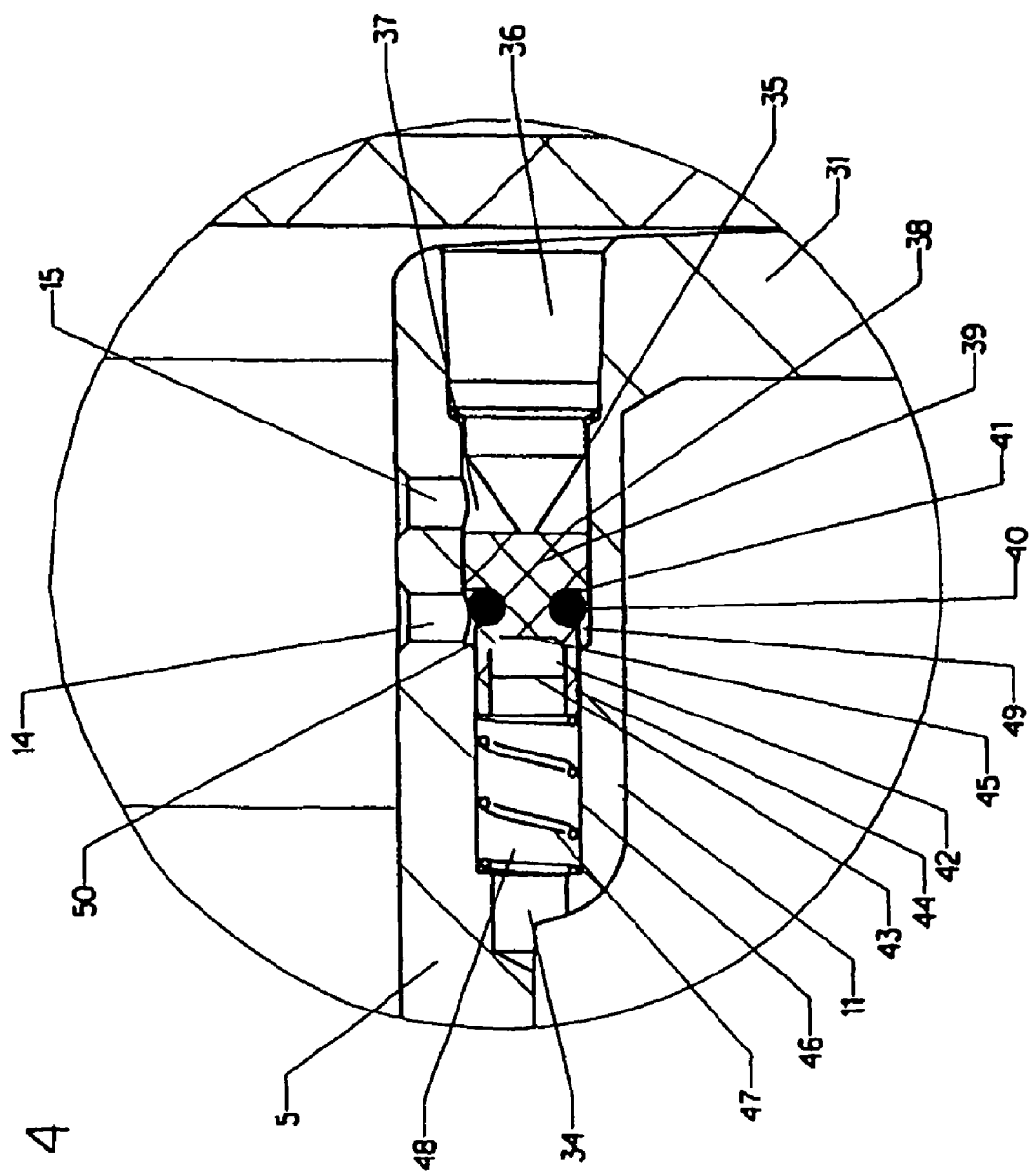
FIG. 4 is an enlarged view of the region, including the valve device, of the piston rod of the spring-actuated brake cylinder depicted in FIG. 3, wherein the ventilation valve, the shutoff valve and the pilot valve are in their open positions.
Figure 6:
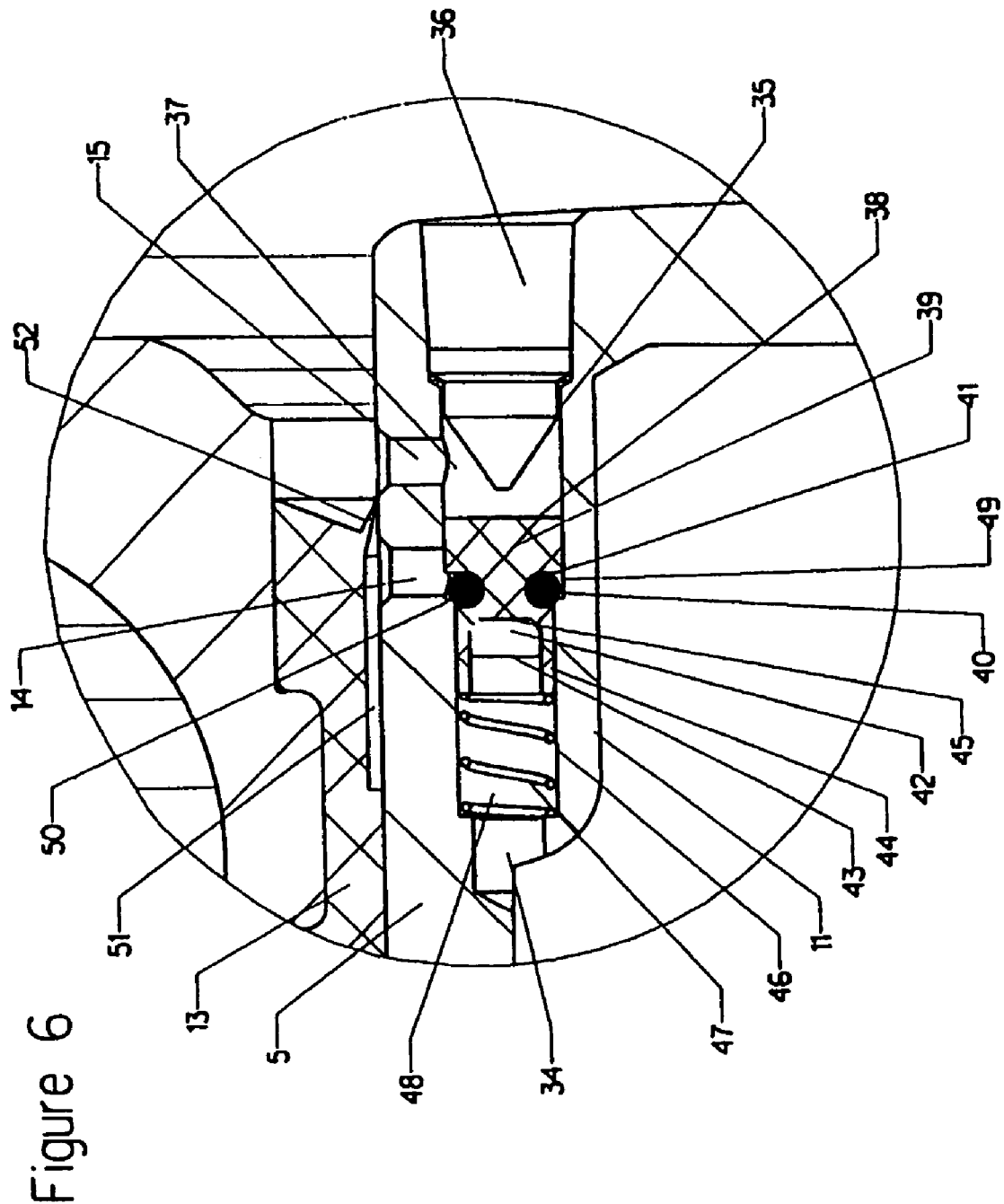
FIG. 6 is an enlarged view of the region, including the valve device, of the piston rod of the spring-actuated brake cylinder depicted in FIG. 5, wherein the ventilation valve has been moved to its closed position by the pressure in the pressurized-fluid chamber of the operating brake cylinder.

Likewise, the valves shown in FIGS. 4 and 6—ventilation valve (39, 44, 49, 50, 40, 34, 14, 15, 37, 47, 48), shutoff valve (5, 14, 13, 52) and pilot valve (5, 15, 13, 52)—of the combined spring accumulator and operating brake cylinder will not be described in more detail, since they correspond to the valves shown in FIGS. 2 and 2a. Components that are the same as the components shown in FIGS. 2 and 2a are denoted by like reference numerals.

FIGS. 1, 3 and 5 show the combined spring accumulator and operating brake cylinder in different operating positions. FIGS. 2, 2a, 4 and 6 show the valves functioning as a ventilation device for the spring chamber of the spring-actuated brake cylinder in the switched positions that they occupied in the different operating positions of piston (7) of the combined spring accumulator and operating brake cylinder.

The function of the inventive ventilation device will be explained in more detail hereinafter.

According to FIG. 1 and FIG. 2, combined spring accumulator and operating brake cylinder (1, 2) is in an operating position in which pressure is admitted to pressurized-fluid chamber (4) of spring-actuated brake cylinder (1), while pressurized-fluid chamber (22) of operating brake cylinder (2) is vented. Spring (12) of spring-actuated brake cylinder (1) is compressed by means of piston (7), which is in its left end position. In this position of piston (7), first working port (14) and control port (15) of first valve (39, 44, 49, 50, 40, 34, 14, 15, 37, 47, 48) are covered by sealing element (13, 52). First valve (39, 44, 49, 50, 40, 34, 14, 15, 37, 47, 48) is in its open position. Second valve (5, 14, 13, 52) and third valve (5, 15, 13, 52) are in their closed positions, so that control chamber (37) and working chamber (49) are shut off from pressurized-fluid chamber (22) of operating brake cylinder (2). Pressurized-fluid chamber (22) of operating brake cylinder (2) is therefore shut off by means of second valve (5, 14, 13, 52) from spring chamber (9) of spring-actuated brake cylinder (1) (see FIG. 2).

If compressed air is injected via service brake valve (19) into pressurized-fluid chamber (22) of operating brake cylinder (2), piston (23, 24) thereof is driven in brake-actuation direction by the pressure building up in pressurized-fluid chamber (22)—that is, against the force of spring (26) and in the direction of spring chamber (25). In this situation, piston (7) of spring-actuated brake cylinder (1) remains in its position illustrated in FIG. 1 as long as pressurized-fluid chamber (4) of spring-actuated brake cylinder (1) is not vented. First valve (39, 44, 49, 50, 40, 34, 14, 15, 37, 47, 48) is in its open position (home position), in which second working port (34) is in communication with working chamber (49) and, thus, with first working port (14) via space (48), recess (43) in valve piston (39, 44) and through hole (42) in the wall of valve piston (39, 44). Second valve (5, 14, 13, 52) and third valve (5, 15, 13, 52) remain in their closed positions. This corresponds to the position of first valve (39, 44, 49, 50, 40, 34, 14, 15, 37, 47, 48), of second valve (5, 14, 13, 52) and of third valve (5, 15, 13, 52) shown in FIG. 2.

If pressurized-fluid chamber (22) of operating brake cylinder (2) is vented once again, piston (23, 24) of operating brake cylinder (2) returns to its starting position under the force of spring (26).

If, as illustrated in FIG. 3 and FIG. 4, pressurized-fluid chamber (4) of spring-actuated brake cylinder (1) is vented via valve (17) functioning as a handbrake valve, piston (7) of spring-actuated brake cylinder (1) is driven in brake-actuation direction by spring (12), which expands in this situation. In the process, piston (23, 24) of operating brake cylinder (2) is driven by means of piston rod (5) of piston (7) of spring-actuated brake cylinder (1) in the same direction. During this operation, control port (15) and first working port (14) of first valve (39, 44, 49, 50, 40, 34, 14, 15, 37, 47, 48) travel beyond sealing lip (52) of sealing element (13, 52) functioning as the control edge. Second valve (5, 14, 13, 52) and third valve (5, 15, 13, 52) are then in their open positions. Spring chamber (9) of spring-actuated brake cylinder (1) is then in communication with pressurized-fluid chamber (22) of operating brake cylinder (2) via connecting duct (6) in piston rod (5), first valve (39, 44, 49, 50, 40, 34, 14, 15, 37, 47, 48), which is already in open position, and opened second valve (5, 14, 13, 52).

Since piston (7) of spring-actuated brake cylinder (1) moves in the direction of pressurized-fluid chamber (4) during the venting operation of pressurized-fluid chamber (4) of spring-actuated brake cylinder (1), the volume of spring chamber (9) increases. Because of the pressure difference that then develops between the pressure in pressurized-fluid chamber (22) of operating brake cylinder (2) and the reduced pressure in spring chamber (9) of spring-actuated brake cylinder (1), an air flow develops from pressurized-fluid chamber (22) of operating brake cylinder (2) toward spring chamber (9) of spring-actuated brake cylinder (1). This air flow passes through opened second valve (5, 14, 13, 52) and first working port (14) into working chamber (49) of first valve (39, 44, 49, 50, 40, 34, 14, 15, 37, 47, 48) and, from there, continues via through hole (42) and adjoining recess (43) in valve piston (39, 44) as well as via space (48) to second working port (34) disposed on the end face of first valve (39, 44, 49, 50, 40, 34, 14, 15, 37, 47, 48). This means that the air flow enters valve piston (39, 44) in the direction perpendicular to the longitudinal axis of valve piston (39, 44), is deflected therein in the transition region from through hole (42) to recess (43) and emerges from valve piston (39, 44) in the direction of the longitudinal axis thereof. From second working port (34), the air flow then passes through connecting duct (6) in piston rod (5) and adjoining through hole (10) in piston (7) of spring-actuated brake cylinder (1) into spring chamber (9). Pressure equalization is established between spring chamber (9) of spring-actuated brake cylinder (1) and pressurized-fluid chamber (22) of the operating brake cylinder. Pressure equalization in pressurized-fluid chamber (22) of operating brake cylinder (2) then takes place via the vehicle brake system, for example via service brake valve (19) to atmosphere.

If pressurized fluid is again injected into pressurized-fluid chamber (4) of spring-actuated brake cylinder (1), piston (7) travels in the direction of spring chamber (9). Since the volume of spring chamber (9) then decreases, the air present in spring chamber (9) is forced through opened first valve (39, 44, 49, 50, 40, 34, 14, 15, 37, 47, 48) and opened second valve (5, 14, 13, 52) into pressurized-fluid chamber (22) of operating brake cylinder (2). Then, pressure equalization in pressurized-fluid chamber (22) of operating brake cylinder (2) again takes place via the vehicle brake system, for example via service brake valve (19) to atmosphere.

Only in the last part of the travel of piston (7) of spring-actuated brake cylinder (1), when first working port (14) and control port (15) travel beyond sealing lip (52) of sealing element (13, 52) functioning as a control edge, does second valve (5, 14, 13, 52) and then third valve (5, 15, 13, 52) reach their closed positions. Second valve (5, 14, 13, 52) then shuts off communication between pressurized-fluid chamber (22) of operating brake cylinder (2) and spring chamber (9) of spring-actuated brake cylinder (1) in the direction of spring chamber (9). The slight overpressure building up in spring chamber (9) during further movement of piston (7) in the same direction is dissipated by the fact that the air flows out of the spring chamber through opened first valve (39, 44, 49, 50, 40, 34, 14, 15, 37, 47, 48) into space (51) in sealing element (13, 52), lifts up sealing lip (52) of sealing element (13, 52) from piston rod (5) and flows to pressurized-fluid chamber (22) of operating brake cylinder (2) via the resulting gap between sealing lip (52) and piston rod (5).

If compressed air is injected via service brake valve (19) into pressurized-fluid chamber (22) of operating brake cylinder (2) while pressurized-fluid chamber (4) of spring-actuated brake cylinder (1) is vented, it is also admitted into control chamber (37) and working chamber (49) of first valve (39, 44, 49, 50, 40, 34, 14, 15, 37, 47, 48). Because of the force of the pressure then building up in control chamber (37), valve piston (39, 44) is pushed very rapidly against the force of spring (47) opposing this force and against the force of the pressure in working chamber (49) in the direction of valve seat (50) until it comes to bear with its sealing member (40) on valve seat (50). First valve (39, 44, 49, 50, 40, 34, 14, 15, 37, 47, 48) is then closed and, thus, spring chamber (9) of spring-actuated brake cylinder (1) is shut off from pressurized-fluid chamber (22) of operating brake cylinder (2). Since the cross section of through hole (42) in the wall of valve piston (39, 44) becomes progressively smaller during the closing operation of first valve (39, 44, 49, 50, 40, 34, 14, 15, 37, 47, 48), and because through hole (42) is preferably so disposed on valve piston (39, 44) that it is already closed before sealing member (40) bears on valve seat (50), only a negligibly small quantity of air reaches spring chamber (9) of spring-actuated brake cylinder (1) during the closing operation.

If, as illustrated in FIG. 5, pressurized-fluid chamber (4) of spring-actuated brake cylinder (1) is in communication with atmosphere via handbrake valve (17), while pressure is still being admitted to pressurized-fluid chamber (22) of operating brake cylinder (2), piston (7) of spring-actuated brake cylinder (1) is driven in brake-actuation direction by the force of spring (12), which expands in this situation. In the process, piston rod (5) of spring-actuated brake cylinder (1) plunges into pressurized-fluid chamber (22) of operating brake cylinder (2). Since control port (15) of first valve (39, 44, 49, 50, 40, 34, 14, 15, 37, 47, 48), viewed from pressurized-fluid chamber (22) of operating brake cylinder (2), is disposed in front of first working port (14) of first valve (39, 44, 49, 50, 40, 34, 14, 15, 37, 47, 48), control port (15) already travels beyond sealing lip (52) of sealing element (13, 52) functioning as the control edge when first working port (14) is still covered by sealing element (13, 52). Sealing lip (52) of sealing element (13, 52) is then located between control port (15) and first working port (14), as can be seen in FIG. 6. Compressed air from pressurized-fluid chamber (22) then passes via control port (15) into control chamber (37) of first valve (39, 44, 49, 50, 40, 34, 14, 15, 37, 47, 48).

If the pressure in control chamber (37) has risen so far that its force exerted on first active face (38) of valve piston (39, 44) overcomes the force of spring (47) exerted on valve piston (39, 44), valve piston (39, 44) in opposition to the force moves left in the direction of space (48) of first valve (39, 44, 49, 50, 40, 34, 14, 15, 37, 47, 48), until it bears with its sealing member (40) on valve seat (50). First valve (39, 44, 49, 50, 40, 34, 14, 15, 37, 47, 48) then reaches its closed position. During further movement of piston rod (5), connected to piston (7), of spring-actuated brake cylinder (1) in the direction of pressurized-fluid chamber (22), first working port (14) of first valve (39, 44, 49, 50, 40, 34, 14, 15, 37, 47, 48) travels beyond sealing lip (52) of sealing element (13, 52). First working port (14) is then exposed to the pressure in pressurized-fluid chamber (22) of operating brake cylinder (2). However, since first valve (39, 44, 49, 50, 40, 34, 14, 15, 37, 47, 48) has previously reached its closed position, pressurized-fluid chamber (22) of operating brake cylinder (2) remains shut off from spring chamber (9) of spring-actuated brake cylinder (1).

Figure 7:
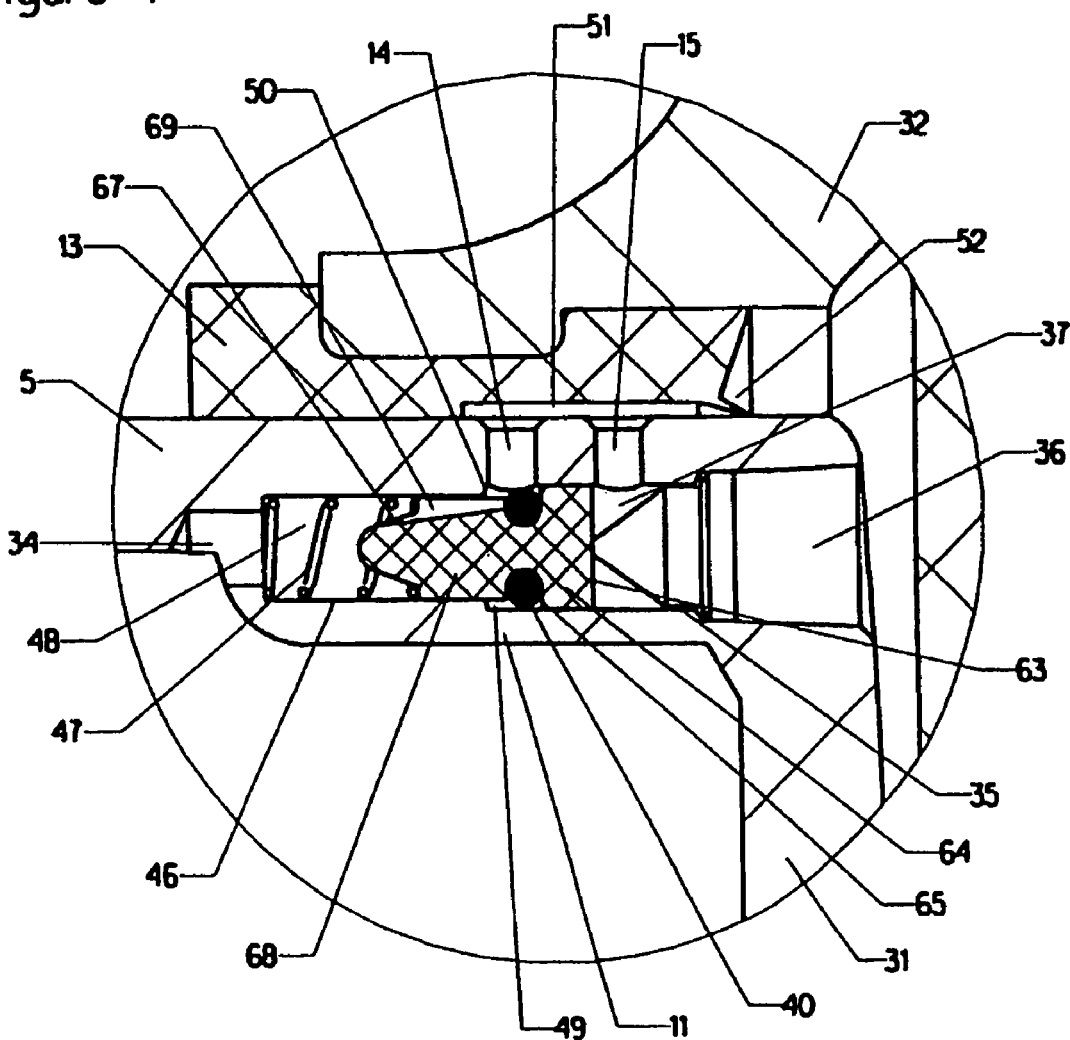
FIG. 7 is an enlarged view of the region of the piston rod of the spring-actuated brake cylinder in which the ventilation valve is disposed, wherein the valve piston of the ventilation valve is designed as a fan-type piston according to an embodiment of the present invention.

FIG. 7 is an enlarged detail view of the region of piston (5) of spring-actuated brake cylinder (1), in which the first valve, the second valve and the third valve are disposed. The valve device comprising the first valve, second valve and third valve is distinguished from the corresponding valve device according to the embodiment described above merely by the fact that the stepped valve piston of the first valve of the valve device depicted in FIG. 7 is designed as a fan-type piston. Components that are the same as components illustrated and described in the embodiment described above are denoted by like reference numerals.

A stepped valve piston (64, 68) is disposed in multiply stepped bore (35, 46) in thickened part (11) of piston rod (5) of spring-actuated brake cylinder (1) such that it can move in the direction of the longitudinal axis of bore (35, 46). Valve piston (64, 68) divides bore (35, 46) into control chamber (37), working chamber (49) and space (48), to which second working port (34) is adjoined. For practical purposes, therefore, space (48) is a part of second working port (34). In the portion of thickened region (11) of piston rod (5), in which sub-region (35) of bore (35, 46) having the larger diameter is located, there are disposed, running perpendicular to the longitudinal axis of valve piston (64, 68), first working port (14), which opens into working chamber (49), and control port (15), which opens into control chamber (37). Second working port (34) is disposed on the end face of first valve (64, 68, 49, 50, 40, 34, 14, 15, 37, 47, 48) distal to closure part (36) for bore (35, 46).

A first portion (64) of valve piston (64, 68) is guided in sub-region (35) of bore (35, 46) having the larger diameter. Adjoining this is a second portion (68) which is guided in sub-region (46) of bore (35, 46) having the smaller diameter. A circumferential groove functioning as a seat (65) for sealing member (40) is provided on the circumference of second portion (68) in the region of the step from first portion (64) to second portion (68) of valve piston (64, 68). A plurality of groove-like depressions (66, 69) running in the direction of the longitudinal axis of valve piston (64, 68) are disposed in the cylindrical surface of second portion (68) of valve piston (64, 68). Groove-like depressions (66, 69) begin close to or at seat (65) for sealing member (40) of valve piston (64, 68), run in the direction of the longitudinal axis of valve piston (64, 68), and extend to the end of valve piston (64, 68) proximal to space (48). Bottom (67) of each of the groove-like depressions (66, 69) forms a chamfer, which begins at the end region of valve piston (64, 68) proximal to space (48) and rises in the direction of seat (65) for sealing member (40). The end region of valve piston (64, 68) proximal to space (48) tapers conically in the direction of space (48). Groove-like depressions (66, 69) form passages, via which first working port (14) is in communication with space (48) and, thus, with second working port (34) when first valve (64, 68, 50, 40, 34, 14, 15, 37, 47, 48) is in open position.

Valve piston (64, 68) is urged in opening direction of first valve (64, 68, 49, 50, 40, 34, 14, 15, 37, 47, 48) by compression spring (47) disposed in space (48), and, in this way, is held with its end face (63) bounding control chamber (37) against closure part (36), which also functions as a stop for valve piston (64, 68).

Together with first working port (14), annular sealing element (13, 52) surrounding piston rod (5) forms second valve (5, 14, 13, 52) functioning as the shutoff valve. Together with control port (15), it forms third valve (5, 15, 13, 53) functioning as the pilot valve.

Figure 7A:
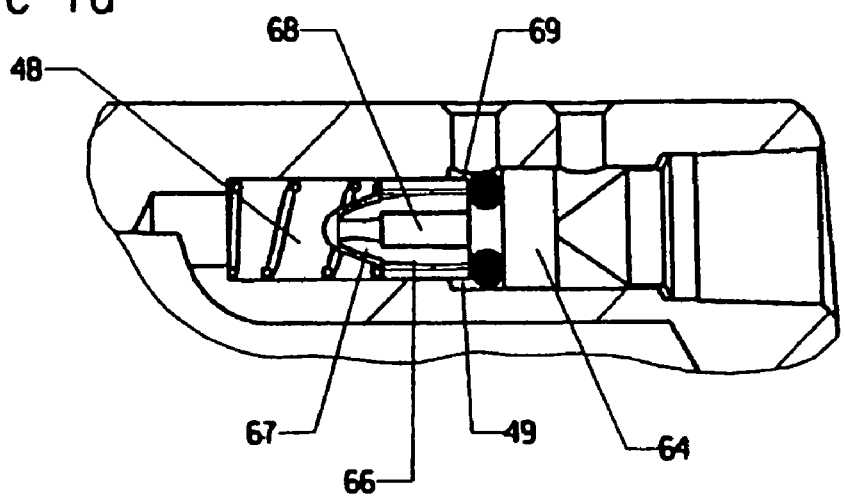
FIG. 7a is a sectional view through the valve depicted in FIG. 7, wherein the valve piston is turned 90° around its longitudinal axis.

FIG. 7a is a sectional view through valve piston (64, 68), in which valve piston (64, 68) is turned 90° around its longitudinal axis. Groove-like depressions (66, 69) disposed in the cylindrical surface of valve piston (64, 68) are visible in this view.

It should be appreciated that it is also possible to form second portion (68) of valve piston (64, 68) such that it tapers conically in the direction of space (48) and to provide rib-like projections, preferably at constant spacing from one another, on the periphery of this portion (68) of valve piston (64, 68). The rib-like projections begin at or close to the circumferential groove functioning as seat (65) for sealing member (40), run in the direction of the longitudinal axis of valve piston (64, 68), and extend to the end of valve piston (64, 68) proximal to space (48). Each of the rib-like projections is constructed and arranged such that its end distal to the conical base of the second portion of the valve piston runs parallel to the wall bounding stepped bore (35, 46). The rib-like projections then function to guide portion (68) of valve piston (64, 68) having the smaller diameter in sub-region (46) of bore (35, 46) having the smaller diameter. The mutually facing sides of the rib-like projections and the base of second portion (68) of valve piston (64, 68) then form the passages of the valve piston, via which first working port (14) is in communication with second working port (34) when first valve (64, 68, 49, 50, 40, 34, 14, 15, 37, 47, 48) is open.

As described above, the valve piston can have a plurality of passages. However, it should be understood that, if one passage has sufficiently large dimensions, it is also possible to provide the valve piston with only one passage.

Also, it should be appreciated that the function of the ventilation valve equipped with a valve piston designed in this way is the same as that of the ventilation valve described in the foregoing embodiment, and so there is no need to repeat the functional description.

If the first valve is formed as a pure slide valve, the rib-like projections disposed on second portion (68) of valve piston (64, 68) or groove-like depressions (66, 69) disposed in the cylindrical surface of second portion (68) of valve piston (64, 68) can begin at the control edge in the transition region from first portion (64) to second portion (68) of valve piston (64, 68). Second portion (68) provided with the rib-like projections or the groove-like depressions can then have the same diameter as adjoining first portion (64) of valve piston (64, 68). The end region of working port (14) opening into bore (35, 46) for receiving the valve piston can then function as the working chamber, as can an annular chamber in the cylindrical surface of the valve piston or an annular chamber in the wall bounding bore (35, 46) in the case of an arrangement of a valve piston with a plurality of passages.

Figure 8:
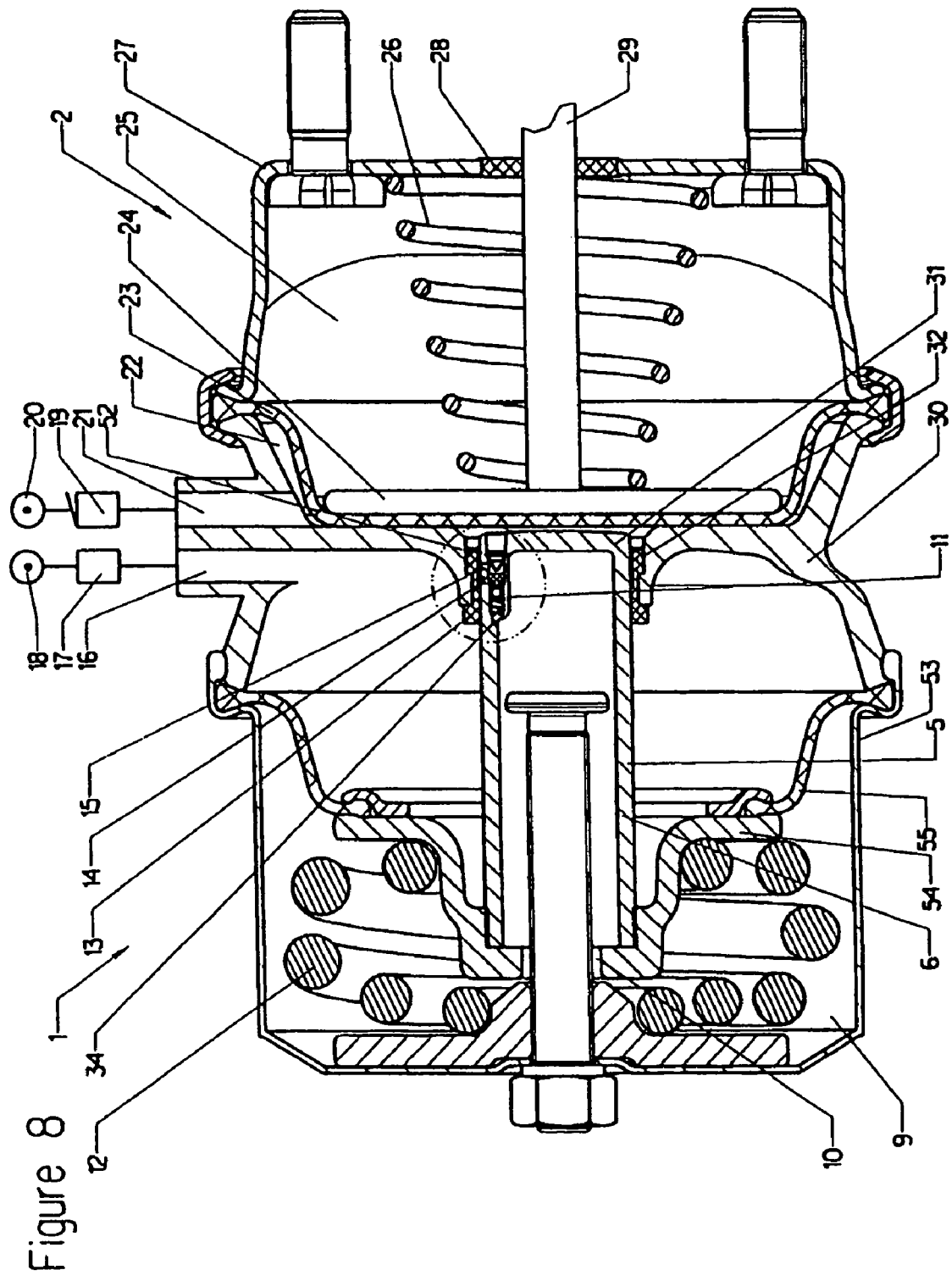
FIG. 8 is a sectional view of a combined spring-actuated brake and operating brake cylinder with ventilation device in accordance with an embodiment of the present invention wherein the spring-actuated brake cylinder is designed as a double diaphragm cylinder.

FIG. 8 is a sectional view of an embodiment of a combined spring accumulator and operating brake cylinder that also includes the inventive ventilation device described above. This combined spring accumulator and operating brake cylinder embodiment differs from the spring accumulator and operating brake cylinder described above in that the piston of the spring-actuated brake cylinder includes an annular diaphragm (55) and a support part (54) of rigid material, such as, for example, steel sheet. Diaphragm (55) is clamped with its inner rim region in the outer rim region of support part (54) and with its outer rim region between wall (30) and cover (53) of spring-actuated brake cylinder (1). Such combined spring accumulator and operating brake cylinders are referred to as "double-diaphragm cylinders." The components of the combined spring accumulator and operating brake cylinder and the components of the ventilation device that are the same as the components of the spring accumulator and operating brake cylinder described above and the components of the ventilation device described above are denoted by like reference numerals, and, so, these components will not be discussed further here.

Valve piston (39, 44, 64, 68) of first valve (39, 44, 49, 64, 68, 50, 40, 34, 24, 25, 37, 47, 48) functioning as the ventilation valve can be made of metal, plastic (which can also be reinforced), hard rubber or any other suitable material.

It should be understood that, with respect to the present invention, the movable valve piston is a movable part of a valve that, together with a control opening (slide valve) or a valve seat (seat valve), forms the valve, or that functions as the support for the sealing member of a valve (such as the valve piston, control piston).

The passage, disposed in the valve piston, via which the first working port is in communication with the second working port when the valve is opened, can also be designed as a duct running obliquely relative to the longitudinal axis of the valve piston, beginning at the cylindrical surface of the valve piston and ending at the end face of the valve piston distal to the control chamber.

According to embodiments of the present invention, the passage of the valve piston can be formed, as described, both by a through hole made through a portion of the valve piston, for example, with recesses disposed in the valve piston and a window-like perforation in communication with one another, and by at least one groove-like depression disposed in the cylindrical surface of this portion of the valve piston or by at least one duct, which is bounded by rib-like projections disposed on the cylindrical surface of the portion of the valve piston.

It is likewise possible according to the present invention to design the valve piston as a tubular part, whose end proximal to the control chamber is closed, while the wall of the tubular part has at least one perforation, which together with the inner space of the tubular part forms the passage, via which the first working port and the second working port of the valve are in communication with one another when the valve is open.

Also, the connecting line placing the second working port of the ventilation valve in communication with the spring chamber can be formed by the inner space of the tubular piston rod, or, in the case of a piston rod of solid material, by a bore passing at least partly through the piston rod in the direction of its longitudinal axis, or even by a connecting line laid in or on the piston rod.

Further, the control edge for the second valve and the third valve does not have to be formed by the sealing element that also functions as a guide for the piston rod of the spring-actuated brake cylinder. There can also be provided a sealing element that is independent of this sealing element and that performs the function of a control edge.

Further still, the housing of the ventilation valve does not have to be formed by the wall of the piston rod, as is shown in the embodiments depicted in the drawing figures. It should be understood that the ventilation valve can have its own housing, in which the valve member is movably disposed and which is provided with working ports and a control port. Such a standalone valve can then be disposed on the piston rod or in an appropriately formed bore or recess in the piston rod, or else in or on a part connected to the piston rod.

The provision of third valve (5, 15, 13, 52) and, thus, the pilot control for first valve (39, 44, 49, 50, 34, 14, 15, 37) is indeed preferred for the inventive ventilation device, but is not absolutely necessary.

If control port (15) is dimensioned such that its passage cross section is substantially larger than the passage cross section of first working port (14), if the face (38, 63) of valve piston (39, 44, 64, 68) acted on by the control pressure has sufficiently large dimensions, and if spring (47) functioning as the restoring force for valve piston (39, 44, 64, 68) is designed such that very rapid response of first valve (39, 44, 49, 50, 40, 34, 14, 15, 37, 47, 48) is achieved when compressed air is injected into pressurized-fluid chamber (22) of operating brake cylinder (2), it can also be appropriate to omit the second valve from the inventive ventilation device.

As illustrated in the drawing figures, the combined spring accumulator and operating brake cylinder can be provided with a common wall (30) for spring-actuated brake cylinder (1) and operating brake cylinder (2). It is also possible, however, to provide each of these two brake cylinders with its own wall and to combine the two brake cylinders as one structural unit, which then represents the combined spring accumulator and operating brake cylinder.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A ventilation device for a combined spring accumulator and operating brake cylinder, comprising:
   a spring-actuated brake cylinder including a first piston actuatable by a first spring, said first piston dividing said spring-actuated brake cylinder into a first pressurized-fluid chamber and a first spring chamber housing said first spring;
   an operating brake cylinder including a second piston actuatable by a pressurized fluid against a force of a second spring, said second piston dividing said operating brake cylinder into a second pressurized-fluid chamber and a second spring chamber housing said second spring;
   a piston rod on said first piston of said spring-actuated brake cylinder, said piston rod extending in the direction of said second pressurized-fluid chamber of said operating brake cylinder via a first through hole in a first wall separating said first pressurized-fluid chamber of said spring-actuated brake cylinder from said second pressurized-fluid chamber of said operating brake cylinder, said piston rod being guided sealingly in said first through hole by means of a sealing element annularly surrounding said piston rod;
   a valve disposed at least one of in and on said piston rod of said first piston of said spring-actuated brake cylinder, said valve being operable to effect ventilation of said first spring chamber of said spring-actuated brake cylinder from said second pressurized-fluid chamber of said operating brake cylinder during depressurization of said second pressurized-fluid chamber, said valve including a first working port, a second working port, a working chamber, a control chamber in communication with said second pressurized-fluid chamber of said operating brake cylinder, and a movable valve piston, said valve being movable against a restoring force from an open position to a closed position during injection of pressurized fluid into said second pressurized-fluid chamber of said operating brake cylinder, said movable valve piston of said valve being drivable against a restoring force in closing direction of said valve when a pressure of said valve piston injected into said second pressurized-fluid chamber of said operating brake cylinder is admitted into said control chamber;
   a space defined at an end of said movable valve piston of said valve distal to said control chamber and bounded by said movable valve piston, said space being in communication with said second working port; and
   said movable valve piston including at least one passage via which said first working port communicates with said space in said open position of said valve, said at least one passage connecting said first working port with said second working port, and being formed by (i) a recess in said valve piston extending from an end face of said valve piston distal to said control chamber into said valve piston, and (ii) at least a second through hole penetrating through a second wall of said valve piston bounding said recess and in communication with said recess.

2. The ventilation device according to claim 1;
   further comprising a third spring in said space for providing a restoring force for said valve piston and urging said valve piston in opening direction of said valve.

3. The ventilation device according to claim 1, wherein said first working port is disposed in said valve oriented perpendicular to a longitudinal axis of said valve, and said second working port is disposed in said valve at an end face of said valve at an end of said valve piston distal to said control chamber.

4. The ventilation device according to claim 1, wherein said recess is formed as a blind bore, and said at least said second through hole is formed as a window-like perforation in said second wall of said valve piston bounding said recess.

5. The ventilation device according to claim 1, wherein said at least one passage is formed by at least one groove-like depression defined in a cylindrical surface of said valve piston and extending in the direction of said space from at least one of a seat for a sealing member of said valve piston and a control edge of said valve piston.

6. The ventilation device according to claim 1, wherein said at least one passage is formed by rib-like projections of said valve piston running in the direction of a longitudinal axis of said valve piston and bounding said at least one passage with mutually facing sides thereof, said rib-like projections extending in the direction of said space from at least one of a seat for a sealing member provided on said valve piston and a step of said valve piston providing a control edge.

7. The ventilation device according to claim 1, wherein said valve is a seat valve.

8. The ventilation device according to claim 1, wherein said valve is a slide valve.

9. The ventilation device according to claim 1, wherein said control port is disposed in front of said first working port from the perspective of said second pressurized-fluid chamber of said operating brake cylinder.

10. A ventilation device for a combined spring accumulator and operating brake cylinder, comprising:
   a spring-actuated brake cylinder including a first piston actuatable by a first spring, said first piston dividing said spring-actuated brake cylinder into a first pressurized-fluid chamber and a first spring chamber housing said first spring;
   an operating brake cylinder including a second piston actuatable by a pressurized fluid against a force of a second spring, said second piston dividing said operating brake cylinder into a second pressurized-fluid chamber and a second spring chamber housing said second spring;
   a piston rod on said first piston extending in the direction of said second pressurized-fluid chamber of said operating brake cylinder via a first through hole in a first wall separating said first pressurized-fluid chamber of said spring-actuated brake cylinder from said second pressurized-fluid chamber of said operating brake cylinder, said piston rod being guided sealingly in said first through hole by means of a sealing element annularly surrounding said piston rod;
   a first valve disposed at least one of in and on said piston rod of said first piston of said spring-actuated brake cylinder, said first valve being operable to effect ventilation of said first spring chamber of said spring-actuated brake cylinder is from said second pressurized-fluid chamber of said operating brake cylinder during depressurization of said first pressurized-fluid chamber of said spring-actuated brake cylinder, said first valve including a first working port, a second working port, a working chamber, a control chamber operable to admit pressure of said second pressurized-fluid chamber of said operating brake cylinder, and a movable valve piston, said first valve being movable against a restoring force from a first open position to a first closed position during injection of pressurized fluid into said second pressurized-fluid chamber of said operating brake cylinder, said movable valve piston of said first valve being drivable against a restoring force in closing direction of said first valve when pressure injected into said second pressurized-fluid chamber of said operating brake cylinder is admitted into said control chamber;
   a second valve operable to shut off said working chamber of said first valve from said second pressurized-fluid chamber of said operating brake cylinder, said second valve being movable from a second closed position when said first pressurized-fluid chamber of said spring-actuated brake cylinder is pressurized to a second open position during depressurization of said first pressurized-fluid chamber and associated movement of said first piston of said spring-actuated brake cylinder in the direction of said first pressurized-fluid chamber, said second valve being movable from said second closed position to said second open position when said second pressurized-fluid chamber of said operating brake cylinder is pressurized and said first pressurized-fluid chamber of said spring-actuated brake cylinder is depressurized, and when said first valve has reached said first closed position due to admission of pressure of said second pressurized-fluid chamber of said operating brake cylinder into said control chamber;
   a space defined at an end of said movable valve piston distal to said control chamber and bounded by said movable valve piston, said space being in communication with said second working port; and
   said movable valve piston including at least one passage, via which said first working port communicates with said space in said first open position of said first valve, said at least one passage connecting said first working port with said second working port, and being formed by (i) a recess in said movable valve piston extending from an end face of said valve piston distal to said control chamber into said valve piston, and (ii) at least a second through hole penetrating through a second wall of said valve piston bounding said recess and in communication with said recess.

11. The ventilation device according to claim 10, further comprising:
   a third valve operable to shut off said second pressurized-fluid chamber of said operating brake cylinder from said control chamber of said first valve, said third valve being in a third closed position when said first pressurized-fluid chamber of said spring-actuated brake cylinder is pressurized and said third valve being movable to a third open position during depressurization of said first pressurized-fluid chamber and associated movement of said first piston of said spring-actuated brake cylinder in the direction of said first pressurized-fluid chamber; and
   said second valve and said third valve being operable such that said second valve is movable (i) to said second open position during movement of said first piston of said spring-actuated brake cylinder in the direction of said first pressurized-fluid chamber of said spring-actuated brake cylinder when said third valve is in said third open position, and (ii) to said third closed position during travel of said first piston in brake-releasing direction before said third valve is moved to said third closed position.

12. The ventilation device according to claim 11, wherein said third valve is formed by said sealing element annularly surrounding said piston rod of said spring-actuated brake cylinder and by said control port of said first valve.

13. The ventilation device according to claim 10, wherein said second valve is formed by said sealing element annularly surrounding said piston rod of said spring-actuated brake cylinder and by said first working port of said first valve.

14. The ventilation device according to claim 10, wherein said sealing element annularly surrounding said piston rod of said spring-actuated brake cylinder includes a sealing lip at an end thereof proximal to said second pressurized-fluid chamber of said operating brake cylinder, said sealing lip annularly surrounding said piston rod to provide a control edge for at least said second valve.

15. The ventilation device according to claim 10, further comprising a third spring in said space for providing a restoring force for said movable valve piston and urging said valve piston in opening direction of said first valve.

16. The ventilation device according to claim 10, wherein said first working port is disposed in said first valve oriented perpendicular to a longitudinal axis of said first valve, and said second working port is disposed in said first valve at an end face of said first valve at an end of said movable valve piston distal to said control chamber.

17. The ventilation device according to claim 10, wherein said recess is formed as a blind bore, and said at least said second through hole is formed as a window-like perforation in said second wall of said valve piston bounding said recess.

18. The ventilation device according to claim 10, wherein said at least one passage is formed by at least one groove-like depression defined in a cylindrical surface of said movable valve piston and extending in the direction of said space from at least one of a seat for a sealing member of said valve piston and a control edge of said valve piston.

19. The ventilation device according to claim 10, wherein said at least one passage is formed by rib-like projections of said movable valve piston running in the direction of a longitudinal axis of said valve piston and bounding said at least one passage with mutually facing sides thereof, said rib-like projections extending in the direction of said space from at least one of a seat for a sealing member provided on said valve piston and a step of said valve piston providing a control edge.

20. The ventilation device according to claim 10, wherein said first valve is a seat valve.

21. The ventilation device according to claim 10, wherein said first valve is a slide valve.

22. The ventilation device according to claim 10, wherein said control port is disposed in front of said first working port from the perspective of said second pressurized-fluid chamber of said operating brake cylinder.

23. The ventilation device according to claim 10, wherein said sealing element annularly surrounding said piston rod of said spring-actuated brake cylinder includes a sealing lip at an end thereof proximal to said second pressurized-fluid chamber of said operating brake cylinder, said sealing lip annularly surrounding said piston rod to provide a control edge for at least said second valve.

* * * * *